United States Patent [19]

Dugan et al.

[11] 3,747,568

[45] July 24, 1973

[54] EGG RACK AND METHOD OF HANDLING SAME

[75] Inventors: James G. Dugan, Littleton, Colo.; Albert S. Hancock, Jr., Orange City, Iowa; Gene W. Hausske, Palmer Lake, Colo.; Kenneth G. Huston; Bernard L. Rosenberg, both of Denver, Colo.; Shirley M. Smith, Littleton, Colo.

[73] Assignee: Robbins Incubator Co., Denver, Colo.

[22] Filed: Jan. 21, 1972

[21] Appl. No.: 219,782

[52] U.S. Cl. ............................................. 119/44
[51] Int. Cl. ........................................... A01k 41/06
[58] Field of Search ........................... 119/35, 37, 44

[56] References Cited
UNITED STATES PATENTS

| | | | |
|---|---|---|---|
| 1,911,249 | 5/1933 | Stover | 119/44 X |
| 2,325,140 | 7/1943 | Lindberg | 119/44 |
| 1,968,326 | 7/1934 | Stover | 119/44 |

*Primary Examiner*—Hugh R. Chamblee
*Attorney*—Sheridan, Ross & Fields

[57] ABSTRACT

Egg processing rack or dolly and method of handling same characterized by a wheel supported frame having one or more adjacent tiers of rectangular open framework trays pivotally supported on the frame midway between their front and rear ends, and mechanism for simultaneously tilting the trays between predetermined angular positions from the horizontal. Each rack is provided with an oscillatable shaft extending between its upper ends and detachable coupling means disposed between adjacent shaft ends. The shaft on a rack disposed at the end of a series of aligned racks may be detachably connected to oscillating mechanism associated with a plurality of incubator bays into which the aligned racks are adapted to be rolled. In a preferred method of handling and/or use of the racks, they are loaded with the flats at the laying farm and bodily transported to a hatchery, thus obviating any intermediate egg handling between loading at the farm and completion of incubation.

22 Claims, 7 Drawing Figures

Patented July 24, 1973

Patented July 24, 1973  3,747,568
2 Sheets-Sheet 2
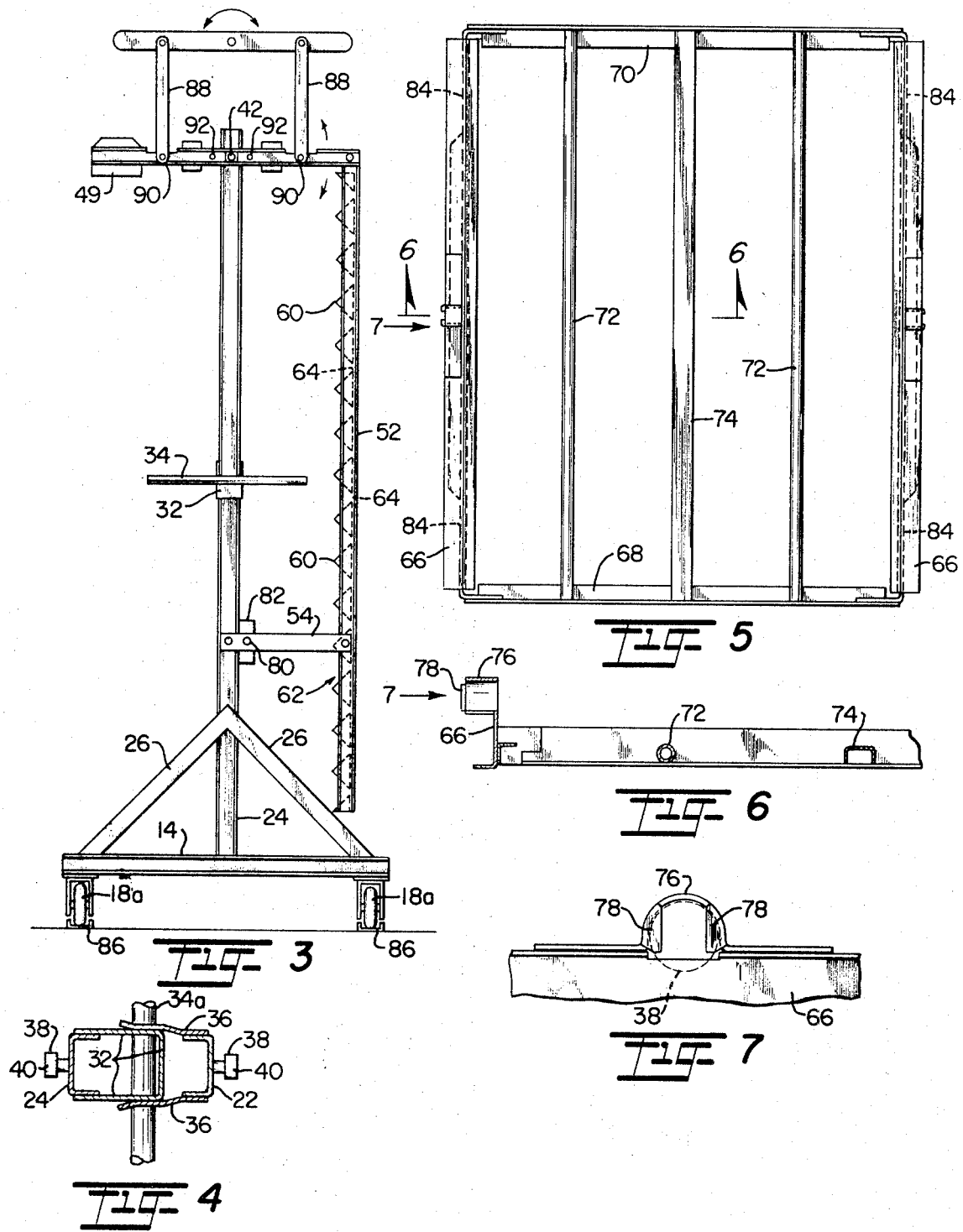

EGG RACK AND METHOD OF HANDLING SAME

BACKGROUND OF THE INVENTION

In what is probably the most simplified form of commercial handling of eggs for incubation, they are loaded into conventional partitioned crates by the flock owner at the laying farm and transported to a hatchery where they are unloaded, graded, etc., and individually transferred to suitable relatively small compartmented flats or other supports. In a more refined and labor saving method of handling eggs, presently in use, the flock owner loads the flats which are transported to the hatchery and the hatchery operator transfers the flats to suitable supports in an incubator, thus eliminating the handling of individual eggs at the hatchery but still necessitating the handling of the flats containing same.

In another form of proposed handling, the eggs are loaded in large racks at the farm and the racks bodily transported to the hatchery. Such racks, however, are not of the type to periodically tilt the eggs during incubation and hence some handling is still required at the hatchery to transfer same onto suitable tiltable supports in the incubator.

As will be apparent, if the large racks could be loaded at the farm, transported to the hatchery and be rolled into an incubator without any handling of individual eggs, or eggs in flats, at the hatchery, labor on the part of the hatchery operator could be further minimized.

SUMMARY OF THE INVENTION

The present invention provides apparatus and process for minimizing the egg handling labor, just referred to. This is attained by performing preliminary steps, such as cleaning, sorting, grading, etc., at the laying farm and loading the eggs in flats supported by trays arranged in one or more tiers disposed in wheel supported racks, each of which is provided with its own egg rack tilting mechanism, the racks being identical and adapted to be interconnected in an incubator bay in such manner that their individual tilting mechanisms may be conjointly operated by a tilting drive source associated with the incubator bay. After processing at the farm is completed, the racks are bodily transported to the hatchery, such as by truck, and fumigation may occur during transit, if this has not previously occurred at the farm. When the racks reach the hatchery the eggs are thus pre-conditioned for transfer of the racks into an incubator, or to a cold storage room if commencement of incubation must be delayed.

The racks of the present invention are ideally suited for handling eggs in the manner just referred to. Each rack or dolly comprises a wheel supported frame having at least two longitudinally spaced vertical columns having aligned pairs of trunnion pins thereon, each pair removably and pivotally supporting tray saddles disposed at opposite edges thereof. An oscillatable shaft extends between the upper ends of the columns and walking beams are secured to opposite ends of the shaft Coupling means on one walking beam is adapted to be detachably connected to the walking beam on a like shaft carried by an adjacent rack, and detachable means connects an end walking beam on a series of aligned racks with oscillating mechanism carried by an incubator or detachably mounted on an end rack for oscillating the plurality of aligned shafts, whereby the trays in all racks may be periodically oscillated simultaneously. The wheels of the racks roll in straight floor channels to align the racks, and other detachable aligning means are provided between adjacent columns to provide alignment at a locus above the floor channels. Each shaft carries arms which reciprocate vertical bars, which are pivotally and slideably connected to rear corners of the trays, said arms, bars, and other idler arms forming a parallelogram linkage system. Removable wheel stops or chocks are associated with the floor channels to prevent longitudinal motion of the connected series of racks. During loading at the farm, transportation to the hatchery and until the racks are interconnected within the incubator bay, the trays therein are locked in horizontal positions.

BRIEF DESCRIPTION OF THE DRAWING

FIG. 3 is an end elevation as viewed in the direction of arrow 3, FIGS. 1 and 2;

FIG. 4 is a section taken on line 4—4, FIG. 1;

FIG. 5 is an enlarged top plan of a tray employed with the rack previously referred to;

FIG. 6 is an enlarged section taken on line 6—6, FIG. 5; and

FIG. 7 is an enlarged side elevation of a detail as viewed in the direction of arrow 7, FIGS. 5 and 6.

DESCRIPTION OF PREFERRED EMBODIMENT

Figure 2:
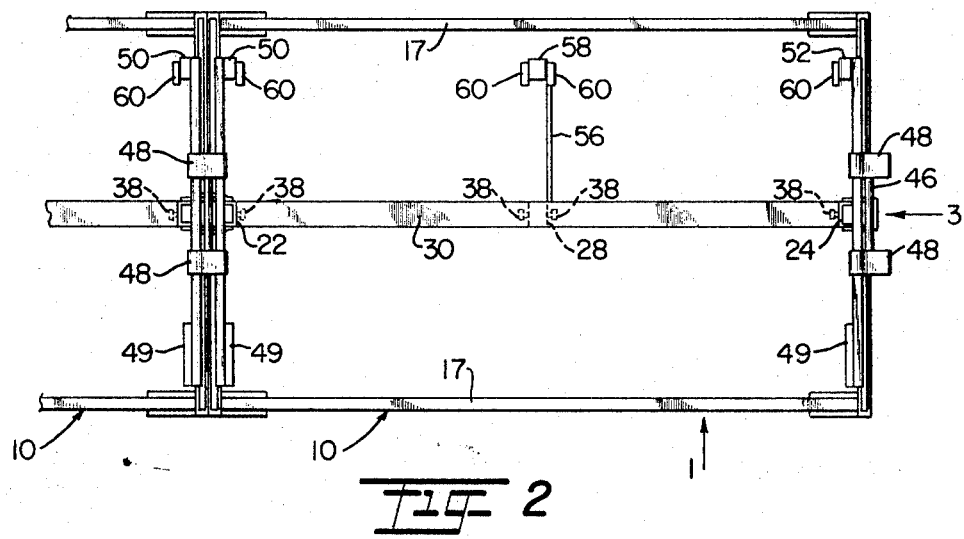
FIG. 2 is a top plan as viewed in the direction of arrow 2, FIG. 1.
Figure 1:
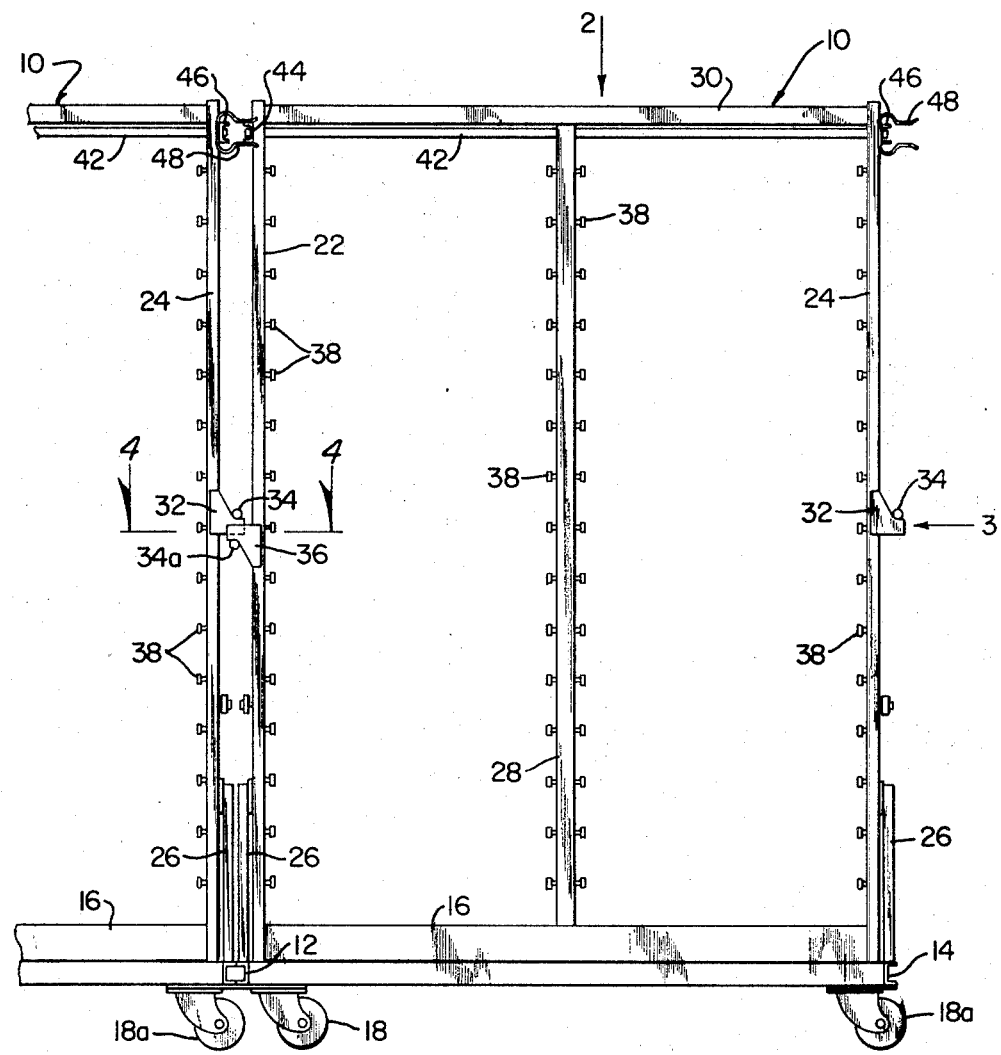
FIG. 1 is a side elevation of a rack and a portion of a second rack forming a part of the subject of the invention as viewed in the direction of arrow 1, FIG. 2.

Referring now to the drawing, rack 10 comprises a base support formed of end cross members 12,14, secured together between their centers by a longitudinally extending tie bar 16 and bars 17 extending between outer ends of members 12,14. A pair of wheels 18 are secured to cross member 12 and a pair of wheels or casters 18a are secured to member 14, thus providing a four wheel base support which may be guided.

Vertical columns 22,24 are secured at their lower ends to cross members 12,14, respectively, and are suitably braced by angular braces 26. A like central column 28 is secured at its lower end to tie bar 16 and the upper ends of the three columns are secured together by a longitudinally extending top tie bar 30.

A U-shaped member 32, having a handle 34 secured thereto, is affixed to column 24 and a pair of paltes 36,36, having a like handle 34a, are secured to column 22. The handle assemblies are at different floor elevations and so arranged that a portion of U-shaped member 32 nests between plates 36,36, thus, in effect, forming a detachable dowel connection between one end of one rack and the end of the adjacent rack. This thus ties adjacent columns together to resist relative lateral displacement and to insure longitudinal alignment of coupled racks.

Columns 22,24,28 support pairs of horizontally aligned trunnion studs 38, each having an enlarged circular head 40 thereon, the purpose of which will subsequently appear. As so far described the various parts are all relatively fixed.

The movable members, which will now be described, comprise a shaft 42 journaled in the upper ends of the columns to the ends of which are affixed walking beams 44,46. The walking beams are of like construction except that beam 46 is provided with a pair of U-shaped clips 48 which telescope around and engage the oppositely extending arms of the walking beam 44 disposed on an adjacent rack, thus providing a drive between shafts 42 of the various aligned racks. Slideably adjustable counter weights 49 are preferably carried by the walking beams to balance the weight of certain parts to now be described.

The free ends of each of the walking beams, at one side of their pivotal axis, are pivotally connected to vertical tray oscillating bars 50,52, the lower end of each bar being pivotally connected by an idler link 54, pivotally connected to a column. A lever 56, equivalent to one arm of a walking beam, is affixed to shaft 42 centrally thereof and pivotally connects with a central tray oscillating bar 58, the lower end of which is pivotally connected to central column by an idler link (not shown) in the same manner as described for the end tray oscillating bars. As will be apparent, the tray oscillating bars form links of a parallelogram linkage system and may move vertically and parallel with the columns when shaft 42 is oscillated between its angular positions of oscillation.

Triangular plates 60 are secured to one side of each of end bars 50,52 and like plates are secured to both of opposite sides of central bar 58. The plates are so spaced to provide triangular entry mouths 62 into spaces 64 disposed between adjacent plates and into which rear corners of the trays, to be subsequently described, are adapted to be inserted.

Referring now to FIGS. 5 to 7, each tray comprises a pair of parallel channel shaped side members or rails 66,66 secured together by front and rear angle shaped cross members 68,70, forming a shallow channel into which egg flats may be inserted and captured against lateral displacement when the trays are tilted. Other members 72,74,72 may be provided to support the flats, their numbers and positioning being chosen in accordance with the size and number of flats to be supported by a tray. Each side member 66 is provided with a downwardly open generally semicircular saddle 76 which is adapted to rest on a trunnion stud 38, a flange or shroud 78 also being provided to engage the annular face of head 40 of a trunnion stud to prevent accidental lateral disengagement therewith.

In one mode of operation of the apparatus the trays are loaded with flats at the laying farm. A pin 80 is inserted through link 54 and a fixed plate 82 to lock the linkage with the walking beams in horizontal positions. The upper leg or flange of each channel member 66 on a tray at a cut-out area 84 is then placed on a pair of aligned trunnion studs or pins and is slid thereon, as in closing a drawer, until the ends enter the mouths 62 between the triangular plates 60 which form guides for more easily registering the ends into spaces 64 between the triangular plates. Continued rearward movement permits the saddles to drop onto the trunnion studs and secure the tray against fore and aft and lateral motion. When the rack is filled it is transported to the hatchery with all trays locked in horizontal position.

At the hatchery, a first rack is rolled along channels 86 disposed on the floor of an incubator until it is arrested by a suitable stop or chock (not shown). To facilitate rolling the rack wheels into a channel, laterally flared removable ramps (not shown) may be disposed between the floor and entry end of the channels. The next rack is then rolled into the incubator until it is adjacent the first rack and with alignment devices 32,36 nesting and U-shaped clips 48 engaging the walking beam on the second rack. This procedure continues until the incubator bay is filled. Cables, chains, links or the like 88,88 are connected to apertures 90,90 in the walking beam on the last rack, the upper ends of which engage crank pins, links, or drum segments carried by the incubator which may be angularly oscillated to oscillate the walking beam on the last loaded rack. The locking pins 80 may now be removed to permit the racks to be oscillated at predetermined periods as called for in the incubating schedule. A 47° tilt from each side of horizontal has been found to be preferable. To prevent excessive tilting in the event of malfunction of the tilting drive mechanism, a pair of stop pins 92,92 are provided on a walking beam to positively limit walking beam oscillation to approximately 50° to each side of horizontal.

We claim:
1. Egg handling apparatus comprising;
    a. a plurality of identical wheel supported egg racks, each comprising a frame for supporting at least one tier of vertically spaced substantially rectangular egg supporting trays, the wheels of the racks adapted to roll along straight floor guides disposed within an incubator, whereby a plurality of racks may be disposed in juxtaposed axial alignment within the incubator,
    b. means for detachably pivotally supporting each tray, substantially midway between opposite ends thereof, to the frame, whereby it may pivot about a horizontal axis,
    c. an oscillatable shaft journaled on said frame and extending longitudinally between opposite enes thereof,
    d. mechanism connecting said shaft and all trays for conjointly oscillating the trays,
    e. means for detachably connecting one end of a shaft on one frame with an end of a like shaft on an adjacent frame, and
    f. means for detachably connecting one of the shafts with an oscillatable power source carried by the incubator, whereby said one shaft may oscillate the other shafts aligned therewith.

2. Apparatus in accordance with claim 1, wherein said mechanism comprises a parallelogram linkage system.

3. Apparatus in accordance with claim 2, wherein said linkage system includes at least one reciprocable bar engageable with the trays at one side of their pivotal supports.

4. Apparatus in accordance with claim 3, wherein the linkage system includes two reciprocable bars, each being slideably and pivotally engageable with the trays at opposite sides thereof and adjacent ends thereof remote from their pivotal supports.

5. Apparatus in accordance with claim 1, including a walkng beam secured to each end of each shaft, and means carried by one walking beam for detachably connecting it with a walking beam on an adjacent aligned shaft.

6. Apparatus in accordance with claim 5 including stops carried by a walking beam for positively limiting its angular oscillation.

7. Apparatus in accordance with claim 5 wherein the detachable connecting means comprises at least one U-shaped clip adapted to engage with the walking beam on the adjacent shaft.

8. Apparatus in accordance with claim 5 wherein at least one walking beam is provided with a slideable counter weight to counterbalance the weight of the oscillating mechanism.

9. Apparatus in accordance with claim 1 wherein each tray comprises a pair of parallel side rails, said means for pivotally supporting each tray comprising a downwardly open saddle member adapted to detachably rest on a pivot stud disposed on the frame; the construction and arrangement being such that the side rails may be placed on the studs and slid thereon in a direction away from an operator until their rear ends slidably enter between spaced stops carried by vertically reciprocable bars, forming parts of the oscillating mechanism, the saddles thence adapted to drop onto the studs, forming a pivotal support, and capturing a tray to prevent fore and aft movement thereof.

10. Apparatus in accordance with claim 9 wherein said stops comprise spaced triangular paltes, forming tapered mouths for facilitating entry of the rails therebetween.

11. Apparatus in accordance with claim 10 wherein each stud is provided with an enlarged head and each saddle member is provided with a flange for engaging an enlarged head to capture the tray to prevent lateral movement thereof and prevent accidental disengagement with a stud.

12. Apparatus in accordance with claim 1 including means for locking the trays against oscillation when disposed in their horizontal positions.

13. Apparatus in accordance with claim 1 including telescopic means carried by ends of adjacent frames for detachably securing same together, the telescopic means being disposed between lower and upper ends of the frames and adapted to lock the adjacent frames together and prevent lateral relative motion therebetween.

14. Apparatus in accordance with claim 13 wherein each telescopic means is provided with a handle for maneuvering a rack on its supporting wheels.

15. Apparatus in accordance with claim 1 wherein one end of the frame is provided with a pair of laterally spaced non-steerable wheels and the other end is provided with like laterally spaced steerable wheels, such as casters.

16. A method of handling and incubating eggs comprising;
  a. transporting a plurality of racks from a hatch-ery to an egg laying farm, each rack being wheel supported and of a type having a plurality of vertically superposed readily removable egg trays mounted for conjoint angular movement between opposite sides of a horizontal position and adapted to be locked in their horizontal positions, each rack having a shaft extending between its ends mechanically connected to the trays for oscillating same, and means for coupling together the shafts of aligned racks,
  b. loading the trays with eggs at the farm while in their locked horizontal positions and transporting same, while so locked, to a hatchery,
  c. rolling a first rack into an incubator bay to a fixed position therein,
  d. rolling a second rack into the incubator bay in longitudinal alignment with the first rack and adjacent thereto while effecting coupling of its shaft with the shaft on the first rack, in response to its rolling motion,
  e. continuing the incubator loading in like manner, inthe event the bay is of a depth to receive more than two racks,
  f. coupling the sahft of the last rack in the in the bay with shaft oscillating means carried by the incubator, and unlocking the trays so that they may be conjointly oscillated by the shaft oscillating means carried by the incubator,
  g. whereby all handling of the eggs between loading thereof at the farm and incubation thereof at the hatchery, with the exception of the transportation of the racks and their movement within the hatchery, occurs at the farm, thereby minimizing egg handling at the hatchery.

17. A method in accordance with claim 16 including the step of removing all trays from the rack at the laying farm prior to loading thereof and optionally:
  1. loading the trays, while so removed, with egg flats, each adapted to contain a plurality of eggs, onto a tray and bodily transferring each tray with its flats to a rack, or
  2. disposing the lowermost tray in the rack and loading same with egg flats while so disposed, adding the next above tray to the rack and loading same with flats in like manner, and continuing the loading of the trays in like manner until all trays are filled with flats.

18. A method in accordance with claim 16 including the step of transporting the racks to the hatchery in an enclosure, and fumigating th eggs while so enclosed.

19. Apparatus in accordance with claim 1 including means for locking the trays against oscillation.

20. Egg handling apparatus comprising;
  a. a wheel supported egg rack comprising a frame for supporting a tier of vertically spaced substantially rectangular egg supporting trays, the rack adapted to be loaded and unloaded outside of an incubator,
  b. means for detachably pivotally supporting each tray, substantially midway between opposite ends thereof, to the frame, whereby it may pivot about a horizontal axis, and whereby it may be removed from the rack for loading eggs thereon,
  c. a shaft journaled on said frame and oscillatable about an axis parallel with the axes of oscillation of the trays,
  d. mechanism connecting said shaft and all trays for conjointly oscillating the trays comprising a linkage system including a substantially vertically oscillatable bar detachably engageable with edges of the trays at one side of their pivotal supports, and
  e. means for detachably connecting one end of the shaft with an oscillatable power source carried by the incubator.

21. Apparatus in accordance with claim 20 wherein said shaft extends longitudinally between opposite ends of the frame, its other end adapted to be detachably connected to a like shaft on a like frame, whereby said power source may operate the shafts of tandem arranged like racks.

22. Apparatus in accordance with claim 20 so constructed and arrnaged that a tray may be placed upon its pivotal support and slid thereon in a direction away from an operator until it pivotally engages same, the rear end of the tray then adapted to be locked to the bar to prevent oscillation of the tray except as authorized by movement of the bar.

* * * * *